No. 799,184. PATENTED SEPT. 12, 1905.
J. H. PISOR.
FENCE.
APPLICATION FILED APR. 12, 1905.

2 SHEETS—SHEET 1.

WITNESSES:
J. C. Simpson
E. M. Colford

INVENTOR
J. H. Pisor
By Chandler & Chandler
Attorneys.

No. 799,184. PATENTED SEPT. 12, 1905.
J. H. PISOR.
FENCE.
APPLICATION FILED APR. 12, 1905.

2 SHEETS—SHEET 2.

Witnesses
Inventor
J. H. Pisor.
By
Attorneys

UNITED STATES PATENT OFFICE.

JACOB H. PISOR, OF ELECTRIC, MONTANA.

FENCE.

No. 799,184.   Specification of Letters Patent.   Patented Sept. 12, 1905.

Application filed April 12, 1905. Serial No. 255,198.

*To all whom it may concern:*

Be it known that I, JACOB H. PISOR, a citizen of the United States, residing at Electric, in the county of Park, State of Montana, have invented certain new and useful Improvements in Fences; and I do hereby declare the following to be a full, clear, and exact description of the invention, such as will enable others skilled in the art to which it appertains to make and use the same.

This invention relates to fences, and more particularly to wire fences, and has for its object to provide a fence including both barbed and smooth wire, the latter being arranged to prevent animals at one side of the fence from coming into contact with the barbed wire, while the barbed wire prevents other animals from breaking into the field or other inclosure in which the first-mentioned animals are confined.

Another object is to provide a fence including posts especially adapted for use in connection with a fence having the above-named features, another object being to provide stays which will support the wires and which will also hold the wires of one series spaced from those of the other.

The provision of a fence which may be manufactured at a low figure is also an object of this invention.

Other objects and advantages will be apparent from the following description, and it will be understood that changes in the specific construction shown and described may be made and that any suitable materials may be used without departing from the spirit of the invention.

Figure 1:
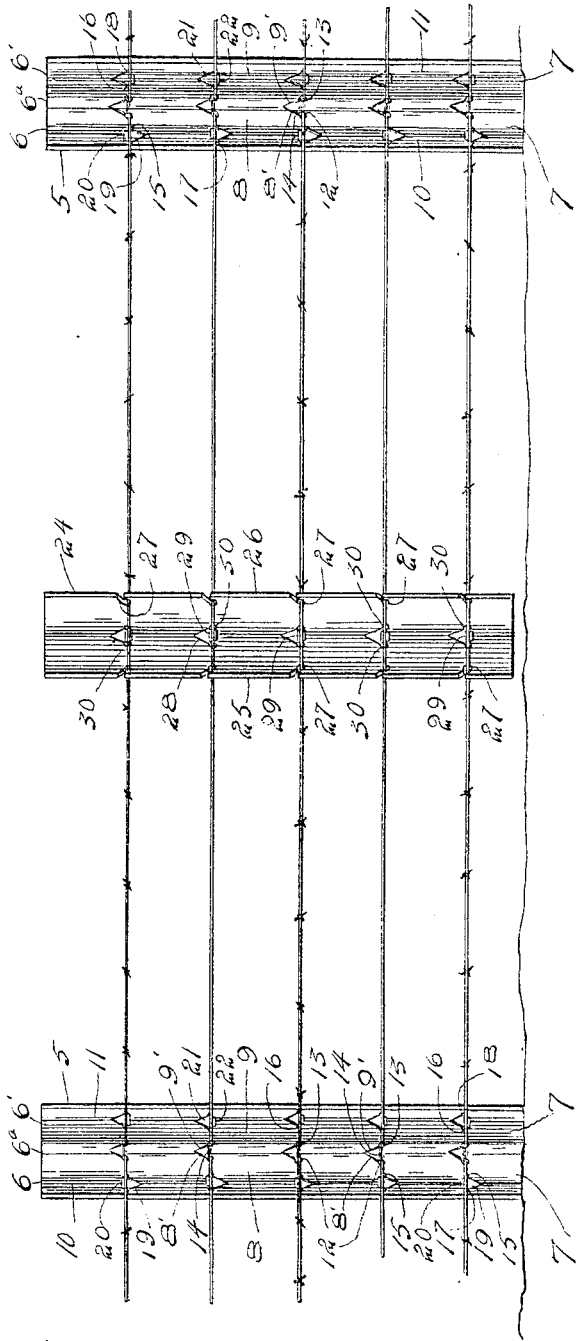
Figure 2:
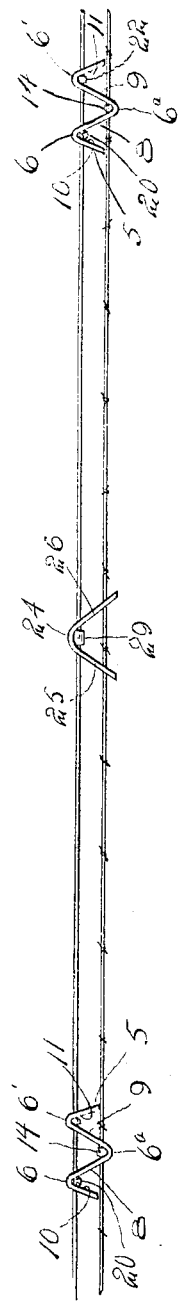
Figure 2:
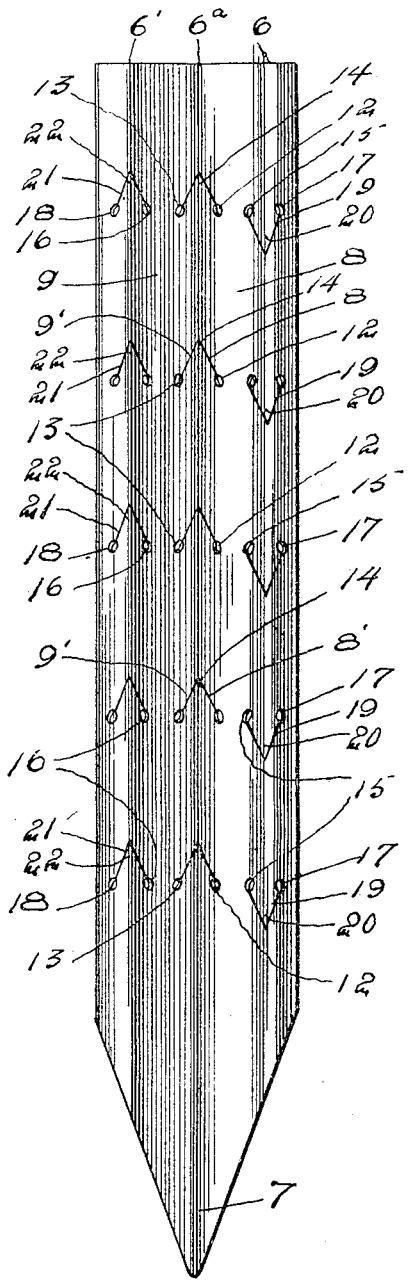
Figure 4:
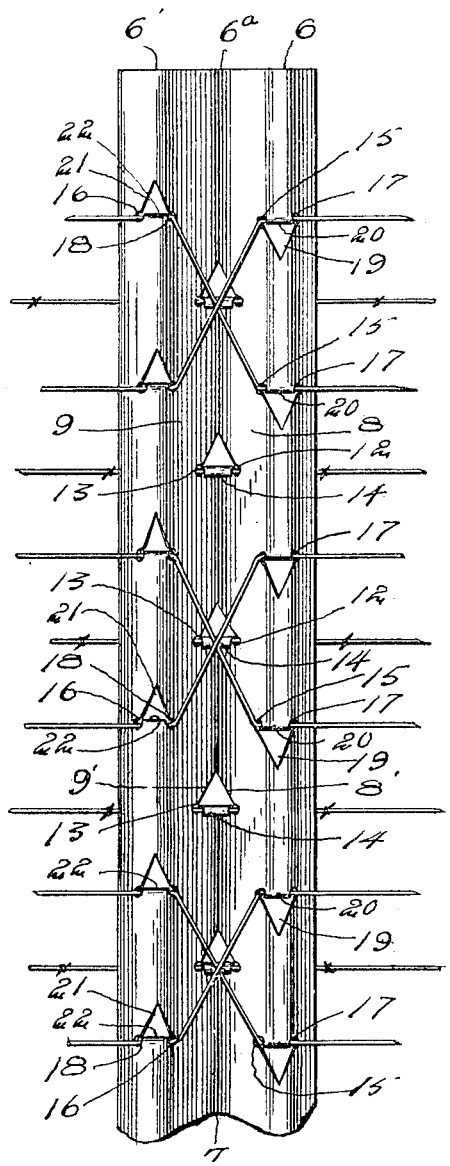

In the drawings forming a portion of the specification, and in which like numerals of reference indicate similar parts in the several views, Figure 1 is an elevation of the present fence. Fig. 2 is an elevation of the opposite side of one of the posts. Fig. 3 is a top plan view of Fig. 1. Fig. 4 is an elevation of one of the posts, showing the strand-wires of one set crossed.

Referring now to the drawings, the present invention comprises posts 5, each of which is formed from a metallic plate pointed at its lower end and bent to form corrugations and resulting interspaces 7, which extend longitudinally of the post. Two of these corrugations 6 and 6' lie at one side of the post, while one (indicated at 6ª) lies at the opposite side centrally thereof, the edges of the plate lying in a plane with the apex of this last-named corrugation. This is accomplished by first bending the plate longitudinally upon a central line to form divergent portions 8 and 9, and these portions are again bent longitudinally in the opposite direction to form portions 10 and 11, which diverge from the portions 8 and 9, respectively, and these several portions form the sides of the corrugations.

Formed through the portion 8 of the post there is a vertical series of spaced perforations 12, a similar series 13 being formed in the portion 9, these series lying adjacent to the apex of the corrugation 6ª and registering in pairs. Slots 8' and 9' are formed in the portions 8 and 9, respectively, one for each of the perforations of these portions, and these slots communicate with these perforations 12 and 13 and slant upwardly and toward each other, communicating at the apex of the corrugation 6ª to form triangular tongues 14, which lie with their bases between the registering pairs of the perforations 12 and 13. Registering openings 15 and 16 are formed in the portions 8 and 9 of the post, respectively adjacent to the apices of the corrugations 6 and 6', and these openings register with similar openings 17 and 18, which are formed in the portions 10 and 11 of the post, the perforations 15, 16, 17, and 18 corresponding in number and arrangement to the perforations 12 and 13, and the registering pairs of perforations 15 and 17 are connected by V-shaped slots 19 to form triangular tongues 20, which are directed downwardly, the perforations of the series 16 and 18 being connected by V-shaped slots 21 to form upwardly-directed triangular tongues 22.

In use the post is disposed with its pointed end embedded in the ground and by reason of its peculiar shape presents a better hold to the earth, the latter filling the spaces between the corrugations, as will be readily understood. The strand-wires of the fence are then engaged in the registering perforations 17, 15, 16, and 18, the tongues 20 and 22 being bent inwardly around the wires, as shown. Other strand-wires are engaged in the registering perforations 12 and 13 and are held in position by the tongues 14, which are bent therearound. It will be understood that one set of these strand-wires are smooth, while the other set are provided with barbs for the purpose described above.

Stays 24 are used in connection with the present fence, and consist of metallic plates bent to form divergent portions 25 and 26, which are provided with registering wire-receiving notches 27 at their free edges, the plate being also notched at the meeting edges of the portions 25 and 26, as shown at 28, this notching resulting in tongues 29, which are triangular in shape and which are directed upwardly. At opposite sides of the base of these tongues there are perforations 30, which register for the reception of strand-wires and with which the notches 28 communicate. These stays are disposed between the two sets of wires, the wires of one set being engaged in the openings 30 and having the tongues 29 bent therearound, while the wires of the other set are engaged in the notches 27 and have the portions lying between these notches and the free edges of the stay bent therearound. It will thus be seen that the wires of the two sets are held in spaced relation to each other and that the wires of each set are also held in spaced relation. In Fig. 4 the adjacent strand-wires of one set are illustrated as being crossed between the corrugations 6 and 6' to take up slack in the wires.

What is claimed is—

1. In a fence the combination with fence-posts each comprising a metallic plate bent to form corrugations lying at opposite sides of the post, said posts having wire-engaging devices formed integral therewith and located at the apices of their corrugations, smooth wires engaged with devices at one side of the posts, barbed wires engaged with the devices at the other sides of the posts and stays engaged between the two sets of wires said stays each comprising a metallic plate bent longitudinally to form divergent portions and having wire-engaging devices at the free edges of its diverging portions and engaged with one set of the wires and having other wire-engaging devices at the meeting edges of the diverging portions and engaged with the other set of wires to hold said sets in spaced relation.

2. A fence-post comprising a metallic plate pointed at one end and bent longitudinally to form corrugations lying at opposite sides of the post said corrugations being notched at their apices to form spaced triangular tongues arranged in vertical series, said plates having registering perforations therein adjacent to the apices of the corrugations and communicating with the notches, said perforations being located at opposite sides of the tongues and being arranged for the reception of wires.

In testimony whereof I affix my signature in presence of two witnesses.

JACOB H. PISOR.

Witnesses:
FRANK J. MILLER,
FRANK HOLMS.